(12) United States Patent
Mikami

(10) Patent No.: US 8,316,458 B2
(45) Date of Patent: Nov. 20, 2012

(54) INFORMATION PROCESSING APPARATUS, CLIENT DEVICE, AND LICENSE MANAGEMENT SYSTEM

(75) Inventor: Yuzo Mikami, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1127 days.

(21) Appl. No.: 12/184,591

(22) Filed: Aug. 1, 2008

(65) Prior Publication Data

US 2009/0038018 A1 Feb. 5, 2009

(30) Foreign Application Priority Data

Aug. 2, 2007 (JP) .................................. 2007-201792

(51) Int. Cl.
*G06F 21/00* (2006.01)
(52) U.S. Cl. .................. 726/27; 726/2; 726/28; 726/29; 726/30
(58) Field of Classification Search ........... 726/2, 27–30
See application file for complete search history.

(56) References Cited

U.S. PATENT DOCUMENTS

| | | | | |
|---|---|---|---|---|
| 5,138,712 A | * | 8/1992 | Corbin | 726/30 |
| 6,023,766 A | * | 2/2000 | Yamamura | 726/29 |
| 2007/0266371 A1 | * | 11/2007 | Ramakrishnan | 717/121 |

FOREIGN PATENT DOCUMENTS

| | | |
|---|---|---|
| JP | 2001-005659 A | 1/2001 |
| JP | 2000-207199 A | 7/2002 |

* cited by examiner

*Primary Examiner* — David Cervetti
*Assistant Examiner* — Ghazal Shehni
(74) *Attorney, Agent, or Firm* — Canon U.S.A., Inc IP Division

(57) ABSTRACT

A license issuing server manages information about a plurality of software applications including an installable software application and a yet uninstallable software application, such as an unreleased software application, in association with a product code. Upon receiving a request for a license file which can identify the product code from a client device, the license issuing server generates a plurality of license files corresponding to information about a plurality of software applications managed in association with the product code and collectively issues the license files to the client device.

17 Claims, 15 Drawing Sheets

FIG.3

| PRODUCT CODE (105) | NUMBER OF PROVISIONAL LICENSES TO BE ASSIGNED (301) | SOFTWARE APPLICATION NAME (302) | CONTENT ID (303) |
|---|---|---|---|
| 1234 | 3 | SOFTWARE APPLICATION A | 111 |
| | | SOFTWARE APPLICATION B | 222 |
| | | | 333 |
| | | | 444 |
| | | | 555 |

115

CLIENT DEVICE A
LICENSE USE INFORMATION 111

FIG.5A

| PRODUCT CODE (105) | LA# (107) | SOFTWARE APPLICATION NAME (302) | CONTENT ID (303) | LF (114) |
|---|---|---|---|---|
| 1234 | AAA | SOFTWARE APPLICATION A | 111 | |

FIG.5B

| PRODUCT CODE | LA# | SOFTWARE APPLICATION NAME | CONTENT ID | LF |
|---|---|---|---|---|
| 1234 | AAA | SOFTWARE APPLICATION A | 111 | VVV |
| | | | 222 | WWW |
| | | | 333 | XXX |
| | | | 444 | YYY |
| | | | 555 | ZZZ |

FIG.5C

| PRODUCT CODE | LA# | SOFTWARE APPLICATION NAME | CONTENT ID | LF |
|---|---|---|---|---|
| 1234 | AAA | SOFTWARE APPLICATION A | 111 | VVV |
| | | SOFTWARE APPLICATION B | 222 | WWW |
| | | | 333 | XXX |
| | | | 444 | YYY |
| | | | 555 | ZZZ |

FIG.5D

| PRODUCT CODE | LA# | SOFTWARE APPLICATION NAME | CONTENT ID | LF |
|---|---|---|---|---|
| 1234 | AAA | SOFTWARE APPLICATION A | 111 | VVV |
| | | SOFTWARE APPLICATION B | 222 | WWW |
| | | | 333 | XXX |
| | | SOFTWARE APPLICATION D | 444 | YYY |
| | | | 555 | ZZZ |

FIG. 5E

LICENSE ISSUING SERVER
LA#: MANAGEMENT DATA 116

| PRODUCT CODE | LA# | SOFTWARE APPLICATION NAME | CONTENT ID | LF |
|---|---|---|---|---|
| 1234 | AAA | SOFTWARE APPLICATION A | 111 | |

FIG. 5G

PRODUCT REGISTRATION DATA 115

| PRODUCT CODE | NUMBER OF PROVISIONAL LICENSES TO BE ASSIGNED | SOFTWARE APPLICATION NAME | CONTENT ID |
|---|---|---|---|
| 1234 | 3 | SOFTWARE APPLICATION A | 111 |
| | | SOFTWARE APPLICATION B | 222 |
| | | | 333 |
| | | | 444 |
| | | | 555 |

FIG. 5F

| PRODUCT CODE | LA# | SOFTWARE APPLICATION NAME | CONTENT ID | LF |
|---|---|---|---|---|
| 1234 | AAA | SOFTWARE APPLICATION A | 111 | VVV |
| | | | 222 | WWW |
| | | | 333 | XXX |
| | | | 444 | YYY |
| | | | 555 | ZZZ |

FIG.6A

CLIENT DEVICE B
LICENSE USE INFORMATION 111

| PRODUCT CODE | LA# | SOFTWARE APPLICATION NAME | CONTENT ID | LF |
|---|---|---|---|---|
| 1234 | BBB | SOFTWARE APPLICATION C | 333 | |

FIG.6B

| PRODUCT CODE | LA# | SOFTWARE APPLICATION NAME | CONTENT ID | LF |
|---|---|---|---|---|
| 1234 | BBB | | 111 | hhh |
| | | | 222 | iii |
| | | SOFTWARE APPLICATION C | 333 | jjj |
| | | | 444 | kkk |
| | | | 555 | lll |
| | | | 666 | mmm |

LICENSE ISSUING SERVER
LA#: BBB MANAGEMENT DATA 116

FIG.6C 114

| PRODUCT CODE | LA# | SOFTWARE APPLICATION NAME | CONTENT ID | LF |
|---|---|---|---|---|
| 1234 | BBB | SOFTWARE APPLICATION C | 333 | |

FIG.6D

| PRODUCT CODE | LA# | SOFTWARE APPLICATION NAME | CONTENT ID | LF |
|---|---|---|---|---|
| 1234 | BBB | | 111 | hhh |
| | | | 222 | iii |
| | | SOFTWARE APPLICATION C | 333 | jjj |
| | | | 444 | kkk |
| | | | 555 | lll |
| | | | 666 | mmm |

PRODUCT REGISTRATION DATA 115

FIG.6E 105   301   302   303

| PRODUCT CODE | NUMBER OF PROVISIONAL LICENSES TO BE ASSIGNED | SOFTWARE APPLICATION NAME | CONTENT ID |
|---|---|---|---|
| 1234 | 3 | SOFTWARE APPLICATION A | 111 |
| | | SOFTWARE APPLICATION B | 222 |
| | | | 333 |
| | | | 444 |
| | | | 555 |

FIG.6F

| PRODUCT CODE | NUMBER OF PROVISIONAL LICENSES TO BE ASSIGNED | SOFTWARE APPLICATION NAME | CONTENT ID |
|---|---|---|---|
| 1234 | 3 | SOFTWARE APPLICATION A | 111 |
| | | SOFTWARE APPLICATION B | 222 |
| | | SOFTWARE APPLICATION C | 333 |
| | | | 444 |
| | | | 555 |
| | | | 666 |

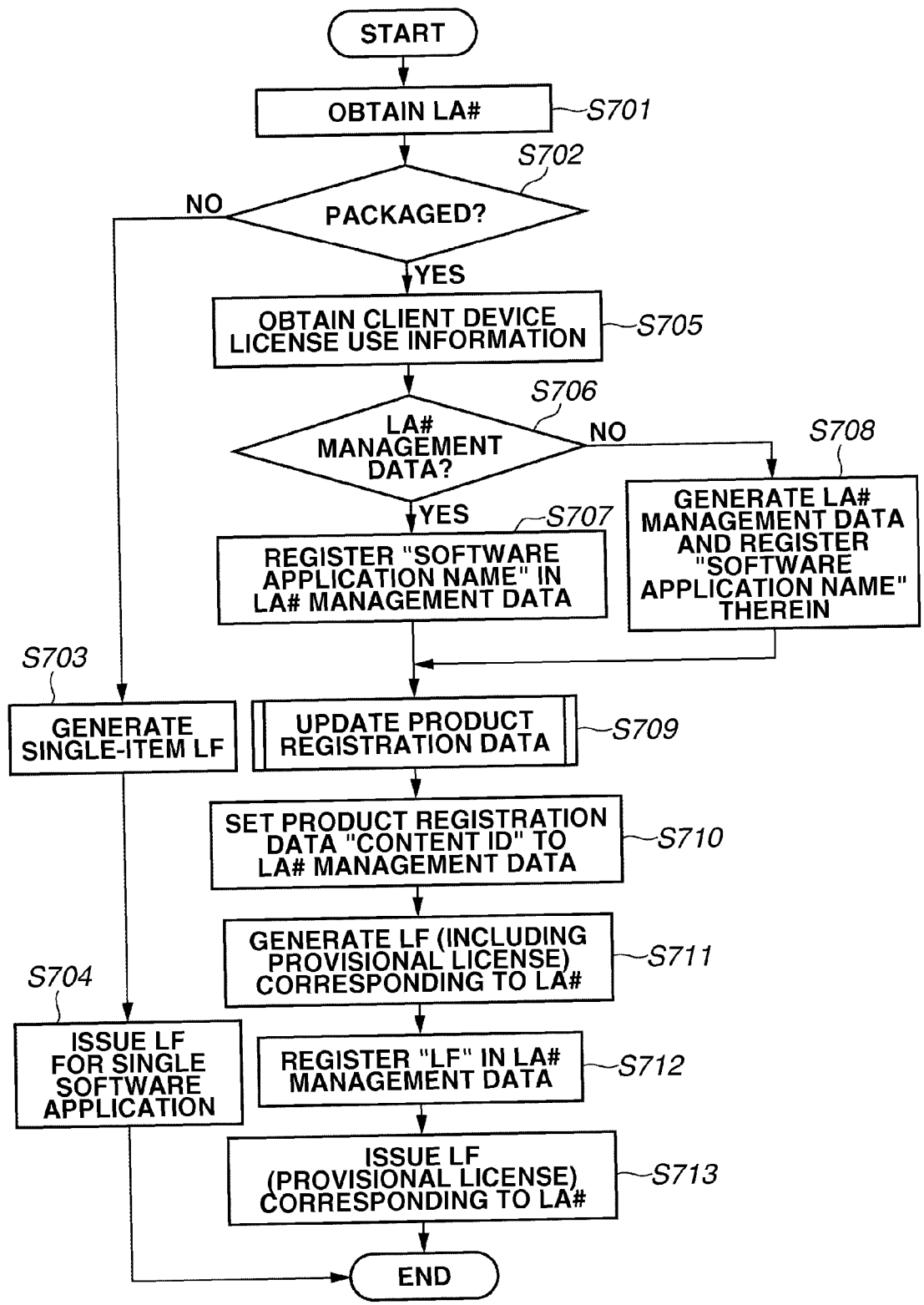

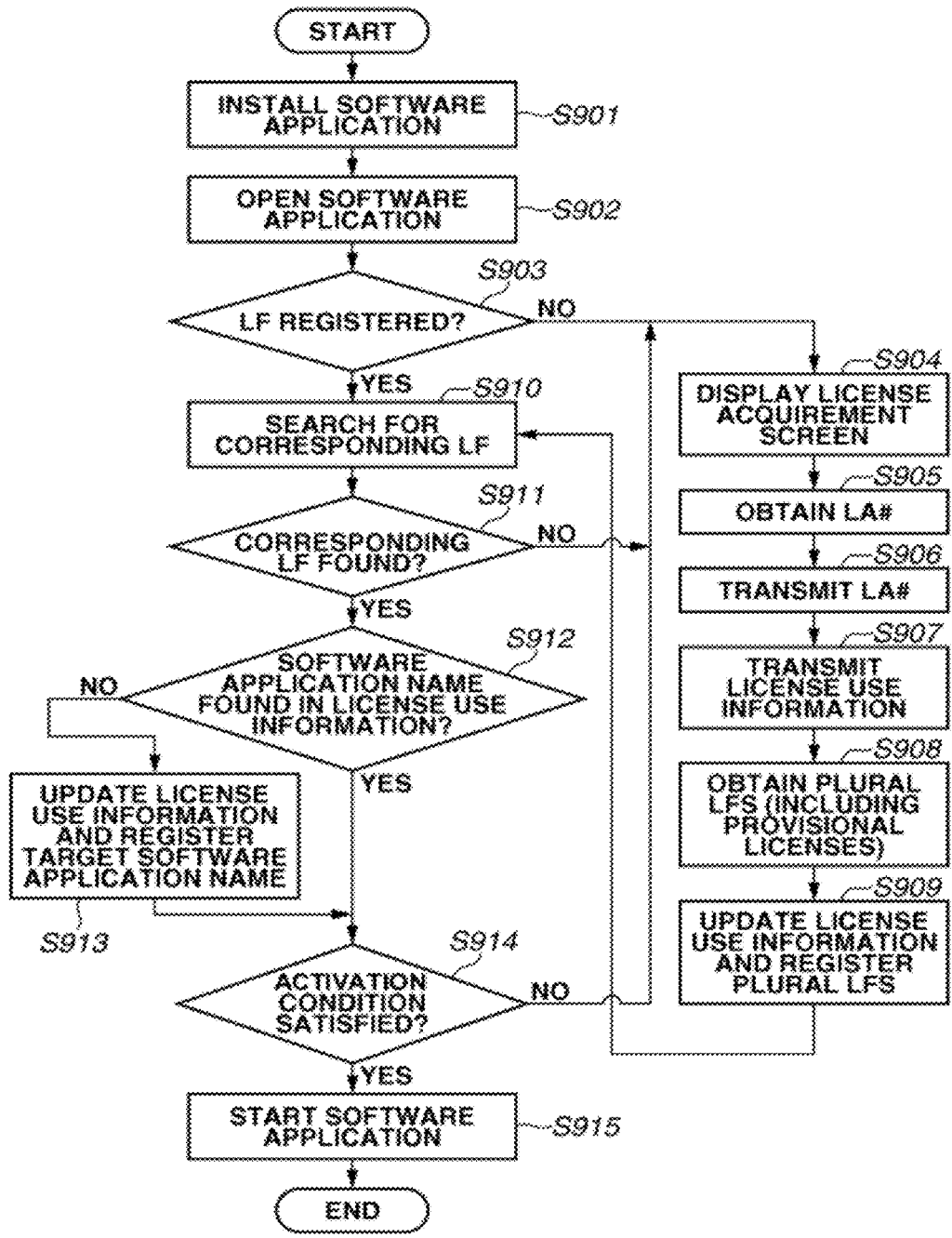

FIG.10A

CLIENT DEVICE A
LICENSE USE INFORMATION 111

| PRODUCT CODE 105 | LA# 107 | SOFTWARE APPLICATION NAME 302 | CONTENT ID 303 | LF 114 |
|---|---|---|---|---|
| 1234 | AAA | SOFTWARE APPLICATION A | 111 | vvv |
| | | SOFTWARE APPLICATION B | 222 | www |
| | | | 333 | xxx |
| | | SOFTWARE APPLICATION D | 444 | yyy |
| | | | 555 | zzz |
| | | SOFTWARE APPLICATION F | 666 | |

FIG.10B

| PRODUCT CODE | LA# | SOFTWARE APPLICATION NAME | CONTENT ID | LF |
|---|---|---|---|---|
| 1234 | AAA | SOFTWARE APPLICATION A | 111 | vvv |
| | | SOFTWARE APPLICATION B | 222 | www |
| | | | 333 | xxx |
| | | SOFTWARE APPLICATION D | 444 | yyy |
| | | | 555 | zzz |
| | | SOFTWARE APPLICATION F | 666 | aaa |
| | | | 777 | bbb |
| | | | 888 | ccc |

FIG.10C

LICENSE ISSUING SERVER
LA#: MANAGEMENT DATA 116 — 114

| PRODUCT CODE | LA# | SOFTWARE APPLICATION NAME | CONTENT ID | LF |
|---|---|---|---|---|
| 1234 | AAA | SOFTWARE APPLICATION A | 111 | vvv |
| | | SOFTWARE APPLICATION B | 222 | www |
| | | | 333 | xxx |
| | | SOFTWARE APPLICATION D | 444 | yyy |
| | | | 555 | zzz |
| | | SOFTWARE APPLICATION F | 666 | |

FIG.10D

| PRODUCT CODE | LA# | SOFTWARE APPLICATION NAME | CONTENT ID | LF |
|---|---|---|---|---|
| 1234 | AAA | SOFTWARE APPLICATION A | 111 | vvv |
| | | SOFTWARE APPLICATION B | 222 | www |
| | | | 333 | xxx |
| | | SOFTWARE APPLICATION D | 444 | yyy |
| | | | 555 | zzz |
| | | SOFTWARE APPLICATION F | 666 | aaa |
| | | | 777 | bbb |
| | | | 888 | ccc |

FIG.10E

PRODUCT REGISTRATION DATA 115

| PRODUCT CODE 105 | NUMBER OF PROVISIONAL LICENSES TO BE ASSIGNED 301 | SOFTWARE APPLICATION NAME 302 | CONTENT ID 303 |
|---|---|---|---|
| 1234 | 3 | SOFTWARE APPLICATION A | 111 |
| | | SOFTWARE APPLICATION B | 222 |
| | | SOFTWARE APPLICATION C | 333 |
| | | | 444 |
| | | | 555 |
| | | | 666 |

FIG.10F

| PRODUCT CODE | NUMBER OF PROVISIONAL LICENSES TO BE ASSIGNED | SOFTWARE APPLICATION NAME | CONTENT ID |
|---|---|---|---|
| 1234 | 3 | SOFTWARE APPLICATION A | 111 |
| | | SOFTWARE APPLICATION B | 222 |
| | | SOFTWARE APPLICATION C | 333 |
| | | SOFTWARE APPLICATION D | 444 |
| | | | 555 |
| | | SOFTWARE APPLICATION F | 666 |
| | | | 777 |
| | | | 888 |

CLIENT DEVICE B
LICENSE USE INFORMATION 111

FIG.11A

| PRODUCT CODE 105 | LA# 107 | SOFTWARE APPLICATION NAME 302 | CONTENT ID 303 | LF 114 |
|---|---|---|---|---|
| 1234 | BBB | SOFTWARE APPLICATION C | 111 | hhh |
|  |  |  | 222 | iii |
|  |  |  | 333 | jjj |
|  |  |  | 444 | kkk |
|  |  |  | 555 | lll |
|  |  |  | 666 | mmm |

FIG.11B

| PRODUCT CODE | LA# | SOFTWARE APPLICATION NAME | CONTENT ID | LF |
|---|---|---|---|---|
| 1234 | BBB | SOFTWARE APPLICATION C | 111 | hhh |
|  |  |  | 222 | iii |
|  |  |  | 333 | jjj |
|  |  |  | 444 | kkk |
|  |  |  | 555 | lll |
|  |  |  | 666 | mmm |
|  |  |  | 777 | nnn |
|  |  |  | 888 | ooo |

FIG.11C

LICENSE ISSUING SERVER
LA#: MANAGEMENT DATA 116 — 114

| PRODUCT CODE | LA# | SOFTWARE APPLICATION NAME | CONTENT ID | LF |
|---|---|---|---|---|
| 1234 | BBB |  | 111 | hhh |
|  |  |  | 222 | iii |
|  |  | SOFTWARE APPLICATION C | 333 | jjj |
|  |  |  | 444 | kkk |
|  |  |  | 555 | lll |
|  |  |  | 666 | mmm |

FIG.11D

| PRODUCT CODE | LA# | SOFTWARE APPLICATION NAME | CONTENT ID | LF |
|---|---|---|---|---|
| 1234 | BBB |  | 111 | hhh |
|  |  |  | 222 | iii |
|  |  | SOFTWARE APPLICATION C | 333 | jjj |
|  |  |  | 444 | kkk |
|  |  |  | 555 | lll |
|  |  |  | 666 | mmm |
|  |  |  | 777 | nnn |
|  |  |  | 888 | ooo |

FIG.11E

PRODUCT REGISTRATION DATA 115

| PRODUCT CODE 105 | NUMBER OF PROVISIONAL LICENSES TO BE ASSIGNED 301 | SOFTWARE APPLICATION NAME 302 | CONTENT ID 303 |
|---|---|---|---|
| 1234 |  | SOFTWARE APPLICATION A | 111 |
|  |  | SOFTWARE APPLICATION B | 222 |
|  | 3 | SOFTWARE APPLICATION C | 333 |
|  |  | SOFTWARE APPLICATION D | 444 |
|  |  |  | 555 |
|  |  | SOFTWARE APPLICATION F | 666 |
|  |  |  | 777 |
|  |  |  | 888 |

INFORMATION PROCESSING APPARATUS, CLIENT DEVICE, AND LICENSE MANAGEMENT SYSTEM

BACKGROUND OF THE INVENTION

1. Field of the Invention

The present invention relates to a technique of issuing a license to use a software application with a license management system.

2. Description of the Related Art

Hitherto, a license management system for managing a license to use a software application to be installed to an information processing apparatus has been proposed. In such a system, a license to use a software application to be installed is issued in association with specific information of the application so as to prevent unauthorized use of the software application to be installed (see Japanese Patent Application Laid-Open No. 2000-207199).

Further, the following method has been proposed (see Japanese Patent Application Laid-Open No. 2001-5659). A computer for issuing a license gives a distribution license only once to a license server computer on a network at a side of a computer for executing an application. Then, a plurality of execution licenses are distributed based on the distribution license on the network at the side of the computer for executing the application. In the case of executing the application on a plurality of computers, the execution license and the distribution license are checked against each other. More specifically, the execution license eliminates a need to communicate with the computer for issuing a license a number of times and request to issue the license.

Recently, various kinds of software applications are integrated to provide a package of a plurality of software applications as an objective-based solution. In such cases, a user needs to acquire each license of the plurality of software applications as is conventionally done. Further, if a new software application is added to an existing package and released, a license is required each time the software application is released.

To be specific, in the conventional cases, if, for example, an additional software application is installed, it is necessary to access a license issuing server and acquire a license each time an additional software application is installed, which is a very troublesome and time-consuming process. In addition to being troublesome, if communications with a license issuing server are stopped, an added software application could not be activated until the communications are reestablished.

Moreover, these techniques cannot collectively issue licenses for a plurality of software applications in response to a request to issue a license for one software application.

SUMMARY OF THE INVENTION

The present invention is directed to a technique that enables reducing communications between a client device and a license issuing server to issue a license and efficiently issuing licenses for a plurality of software applications.

According to an aspect of the present invention, an information processing apparatus includes a management unit configured to manage information about a plurality of software applications including a software application installable to a client device and a software application yet uninstallable to the client device in association with identification information, a receiving unit configured to receive, from the client device, a request for a license file which can identify the identification information, a generating unit configured to generate a plurality of license files corresponding to the information about the plurality of software applications managed by the management unit in association with the identification information identified based on the request received by the receiving unit, and a transmitting unit configured to transmit the plurality of license files generated by the generating unit to the client device serving as a source of the request received by the receiving unit.

According to another aspect of the present invention, a method includes managing information about a plurality of software applications including a software application installable to a client device and a software application yet uninstallable to the client device in association with identification information, receiving a request for a license file to identify the identification information from the client device, generating a plurality of license files corresponding to the information about the plurality of software applications managed in association with the identification information identified based on the received request, and transmitting the plurality of generated license files to the client device serving as a source of the received request.

According to another aspect of the present invention, a client device includes a requesting unit configured to request a license issuing server to issue a license file to activate an installed first software application if the license file to activate the first software application is not managed, an acquisition unit configured to collectively acquire a plurality of license files corresponding to information about a software application including the first software application which is different from the first software application, and managed in association with the same identification information as the first software application as a response to a request from the requesting unit, and an activation unit configured to activate the first software application based on the license file to activate the first software application, which is acquired by the acquisition unit.

According to another aspect of the present invention, a method includes requesting a license issuing server to issue a license file to activate an installed first software application if the license file to activate the first software application is not managed, collectively acquiring a plurality of license files corresponding to information about a software application including the first software application which is different from the first software application and managed in association with the same identification information as the first software application as a response to the request, and activating the first software application based on the acquired license file to activate the first software application.

According to yet another aspect of the present invention, a license management system includes a client device and a license issuing server connected via a network. The client device includes a requesting unit configured to request the license issuing server to issue a license file to activate an installed software application, an acquisition unit configured to acquire a plurality of license files corresponding to at least information about the software application which is sent as a response to the request from the requesting unit, and an activation unit configured to activate the software application based on the license file acquired by the acquisition unit. The license issuing server includes a management unit configured to manage information about a plurality of software applications including a software application installable to the client device and a software application yet uninstallable to the client device in association with identification information, a receiving unit configured to receive a request for a license file which can identify the identification information from the client device, a generating unit configured to generate a plurality of license files corresponding to the information about the plurality of software applications managed by the management unit in association with the identification information identified based on the request received by the receiving unit, and a transmitting unit configured to transmit the plurality of license files generated by the generating unit to the client device serving as a source of the request received by the receiving unit.

According to still another aspect of the present invention, a method for controlling a license management system including a client device and a license issuing server connected via a network includes requesting the license issuing server to issue a license file to activate an installed software application, acquiring a plurality of license files corresponding to at least information about the software application which is sent as a response to the request from the requesting unit, activating the software application based on the acquired license file, managing information about a plurality of software applications including a software application installable to the client device and a software application yet uninstallable to the client device in association with identification information, generating a plurality of license files corresponding to the information about the plurality of software applications managed in association with the identification information identified based on the request received from the client device, and transmitting the generated plurality of license files to the client device serving as a source of the request.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 illustrates the data structure of product registration data for collectively managing information about a plurality of software applications as a software application package according to an exemplary embodiment of the present invention.

FIGS. 5A to 5G illustrate changes of various types of data in a client device A and a license issuing server according to an exemplary embodiment of the present invention.

FIGS. 6A to 6F illustrate changes of various types of data in a client device B and a license issuing server according to an exemplary embodiment of the present invention.

FIG. 7 is a flowchart of processing for generating and issuing a plurality of software application licenses including a provisional license in a license issuing server based on a program executed by a CPU according to an exemplary embodiment of the present invention.

FIG. 9 is a flowchart of processing for acquiring and using a software application license in a client device based on a program executed by a CPU according to an exemplary embodiment of the present invention.

FIGS. 10A to 10F illustrate changes of various types of data in a client device A and a license issuing server according to an exemplary embodiment of the present invention.

FIGS. 11A to 11E illustrate changes of various types of data in a client device B and a license issuing server according to an exemplary embodiment of the present invention.

DETAILED DESCRIPTION OF THE EMBODIMENTS

Various exemplary embodiments, features, and aspects of the invention will be described in detail below with reference to the drawings.

Figure 2:
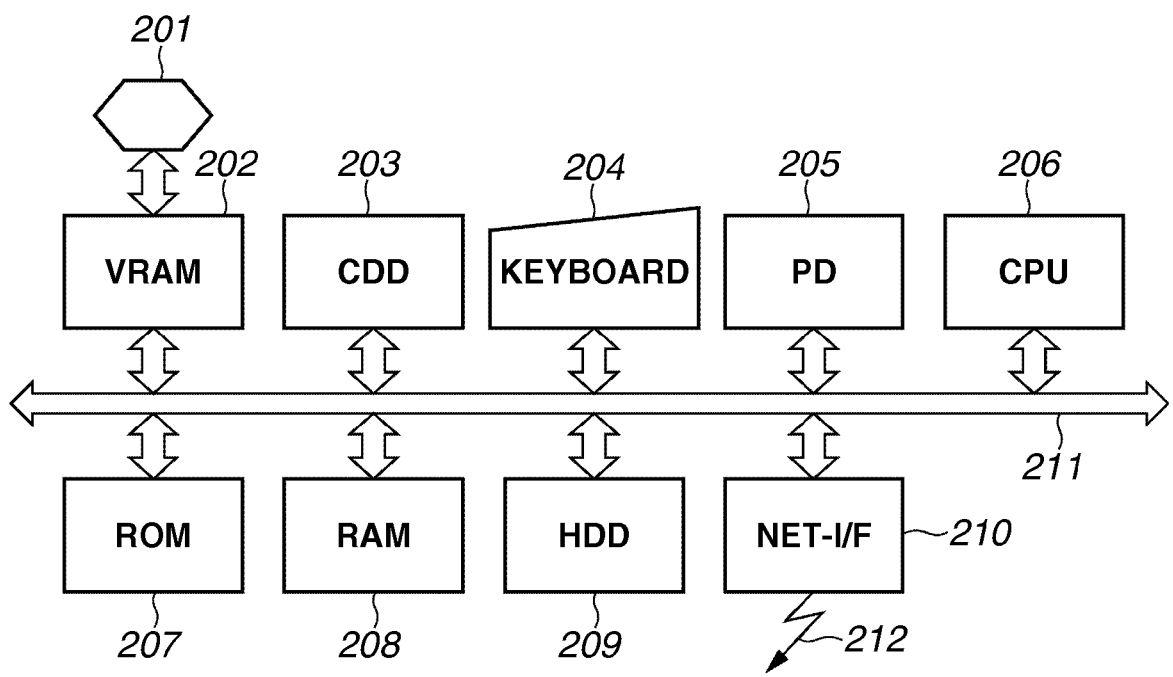
FIG. 2 is a block diagram illustrating the hardware configuration of an information processing apparatus including a client device and a license issuing server according to an exemplary embodiment of the present invention.

FIG. 2 is a block diagram illustrating the hardware configuration of an information processing apparatus such as a client device and a license issuing server. In FIG. 2, a display device 201 includes a display screen that displays user interface information, for example, a window, an icon, a message, a menu, and others. In a video random access memory (VRAM) 202, an image to be displayed on the display device 201 is rendered.

Image data generated in the VRAM 202 is transferred to the display device 201 and an image is displayed thereon. An external storage device, such as a compact disk drive (CDD) 203, is a device that reads/writes various kinds of control programs and data from/to a recording medium such as a compact disk read only memory (CD-ROM) and compact disk recordable (CD-R). A digital versatile disk (DVD) drive can also be employed.

A keyboard 204 includes various keys for inputting characters. A pointing device (PD) 205 is, for example, a mouse, which is used to point at an icon, a menu, and other objects displayed on the display screen of the display device 201. A central processing unit (CPU) 206 controls devices connected to the CPU device based on control programs stored in a read only memory (ROM) 207, a hard disk drive (HDD) 209, and the external storage device 203.

The ROM 207 stores various kinds of control programs and data. A random access memory (RAM) 208 includes a work area of the CPU 206, a data saving area in handling errors, and an area where control programs are loaded. The HDD 209 is a storage device that stores various kinds of control programs and data. The CPU 206 reads and executes a control program stored in any storage medium such as an HDD or a ROM to perform license control processing or the like as described below.

A network interface (Net-I/F) 210 can communicate with another information processing apparatus or a printer via a network 212. A CPU bus 211 includes an address bus, a data bus, and a control bus. A control program can be supplied to the CPU 206 from the ROM 207, the HDD 209, and the CDD 203, or from another information processing apparatus via the network 212.

Figure 1:
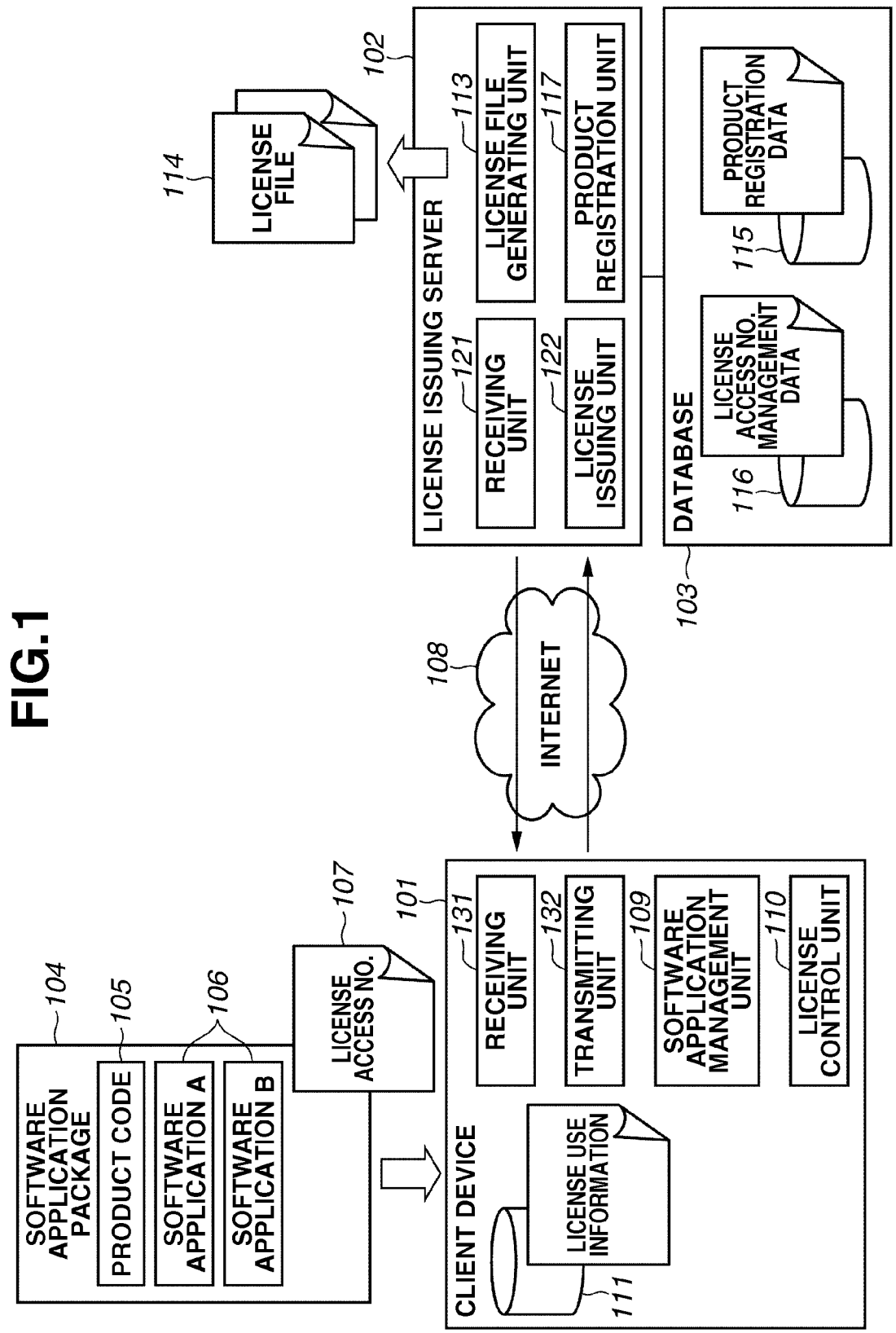
FIG. 1 illustrates the network configuration of an entire license management system and the module configuration of a software application of each device in the system according to an exemplary embodiment of the present invention.

FIG. 1 illustrates the network configuration of the entire license management system and the module configuration of a software application of each device in the system according to an exemplary embodiment of the present invention. This system is designed to manage a license of a software application, in particular, prevent unauthorized use of a software application.

FIG. 1 illustrates a client device 101 operated by a user, and a license issuing server 102. A database 103 is connected to the license issuing server 102. The database 103 stores and manages software application information and license information for the software application.

A software application package 104 is purchased by a user. As for the package, a plurality of software applications 106 are managed under one product code 105, and the plurality of software applications 106 are packaged together into any medium such as a CD-ROM. Further, even through loaded on different media, software applications having the same product code 105 are assumed to belong to the same software application package. A user obtains a license access number (hereinafter referred to as LA #) 107 as specific information for acquiring a license to use a software application having the product code 105 together with the software application package 104. The LA #107 can be obtained in any form. For example, the LA #107 is obtained as information attached or written in an e-mail or paper.

It can be determined whether the LA #107 is set for a single software application or packaged software applications and which product code corresponds to the LA #107. Moreover, the LA #107 may include authentication information for determining whether to issue a corresponding license to the client device 101. A network 108 is, for example, an Internet. The client device 101 is connected to the license issuing server 102 via the network 108.

The configuration of the client device 101 is described next. A software application management unit 109 installs or starts a software application in response to a user's instruction. A license control unit 110 determines a duration of use of a software application, for example, based on an activation condition of the software application described in a license file as well as updates information about license use and controls issuance of a license.

A database 111 stores and manages the software application information installed on the client device 101 or a license therefor as the license use information.

A receiving unit 131 receives external information such as the LA #107 input by a user. A transmitting unit 132 transmits data to the license issuing server 102, for example.

The license issuing server 102 is described next. A license file generating unit 113 reads the software application information and the license information for the software application from the database 103 to generate a license file. The license file generating unit 113 can generate a license file corresponding to a client based on the LA #107 and the product code 105.

A license file (LF) 114 is generated by the license issuing server 102. Product registration data 115 is used for storing and managing the software application information and the license information for the software applications managed under each product code 105. License access number management data 116 is used for storing and managing the software application information and the license information for the software applications managed under each LA #107 used for acquiring a license to each software application.

A product registration unit 117 registers and updates data in the product registration data 115. A receiving unit 121 receives or acquires data from the client device 101 and an external database. A license issuing unit 122 transmits a license file to the client device 101 to issue a license.

FIG. 3 illustrates the data structure of the product registration data 115 for collectively managing information about the plurality of software applications as the software application package 104 in the license issuing server 102. The software application package 104 is identified by a unique product code 105. A group of software applications having the same product code 105 belongs to the same software application package. Even though software applications are supplied by different media such as CD-ROMs, these software applications are managed as the same software application package 104. For example, if a manufacturer delivers a new software application package 104, a new product code 105 is registered to the product registration data 115 in the database 103 connected to the license issuing server 102.

Software applications registered with a code "1234" of the product code 105 in FIG. 3 are assumed to belong to the same software application package. The product registration data 115 includes a content ID 303 as information for identifying a software application belonging to a software application package that can be identified based on a product code. For example, in a software application package having the product code "1234", software applications (software application name: A and B) corresponding to content IDs "111" and "222" are registered. The content ID 303 is set for each software application as an identifier for associating each application with a license.

Further, in addition to already released software applications belonging to a package having the product code "1234", for example, data about a software application planed to be released and registered to the same package can also be registered to the product registration data 115. Then, the content ID 303 can also be set for the software application planed to be released. More specifically, the software application planed to be released is data having no software application name (software application name is not determined) and having content IDs "333" to "555" in the product registration data 115 of FIG. 3.

Further, a license can be also managed in association with a content ID set for a software application that cannot be installed to a client device at this time. The software application that cannot be installed to a client device at this time includes an unreleased software application that is planned to be released in the future and a software application that will become installable in the future depending on a client's environment (nationality etc.). The present exemplary embodiment will be described based on the software application planned to be released in the future.

A license associated with a content ID set for the software application planned to be released in the future is referred to as a provisional license. In the field of the number of provisional licenses to be assigned 301 in the product registration data 115 of FIG. 3, three provisional licenses are set. This value means that, when licenses are issued to the client device 101, three provisional licenses are issued in addition to a license for a released product in a software application package.

An administrator who manages license issuance can set a desired number of provisional licenses to be issued to the client device 101 as the number of provisional licenses to be assigned 301. The product registration data 115 is constantly defined to manage a total sum of licenses for released software applications in the package and provisional licenses. In other words, if a new software application is released and registered to the package, a new content ID is stored in association with the provisional license.

The client device 101 obtains a plurality of license files corresponding to a product code set for a software application package at the same time. For example, unlike the software application package 104 of FIG. 1, when the client device 101 obtains a software application package including only a software application A, a plurality of license files can be obtained from the license issuing server 102 at the same time if the license files have the same product code. After that, if the client device 101 additionally obtains a software application B, the client device 101 can use the software application B by acquiring a content ID and product code for the software application B by use of the obtained license file without requesting a license from the license issuing server 102 again.

The license files of provisional licenses that are obtained at the same time are not applicable to every software application. Only after a new software application is released, the license issuing server defines the software application in the product registration data 115, and a content ID is set for the released software application, the provisional license can function as a general license.

A desired unique number may be used as the product code or the content ID, and characters and symbols can be used in the code. Further, a content ID 303 corresponding to a software application 302 may be directly assigned to the software application itself as identification information of the content ID.

Figure 4:
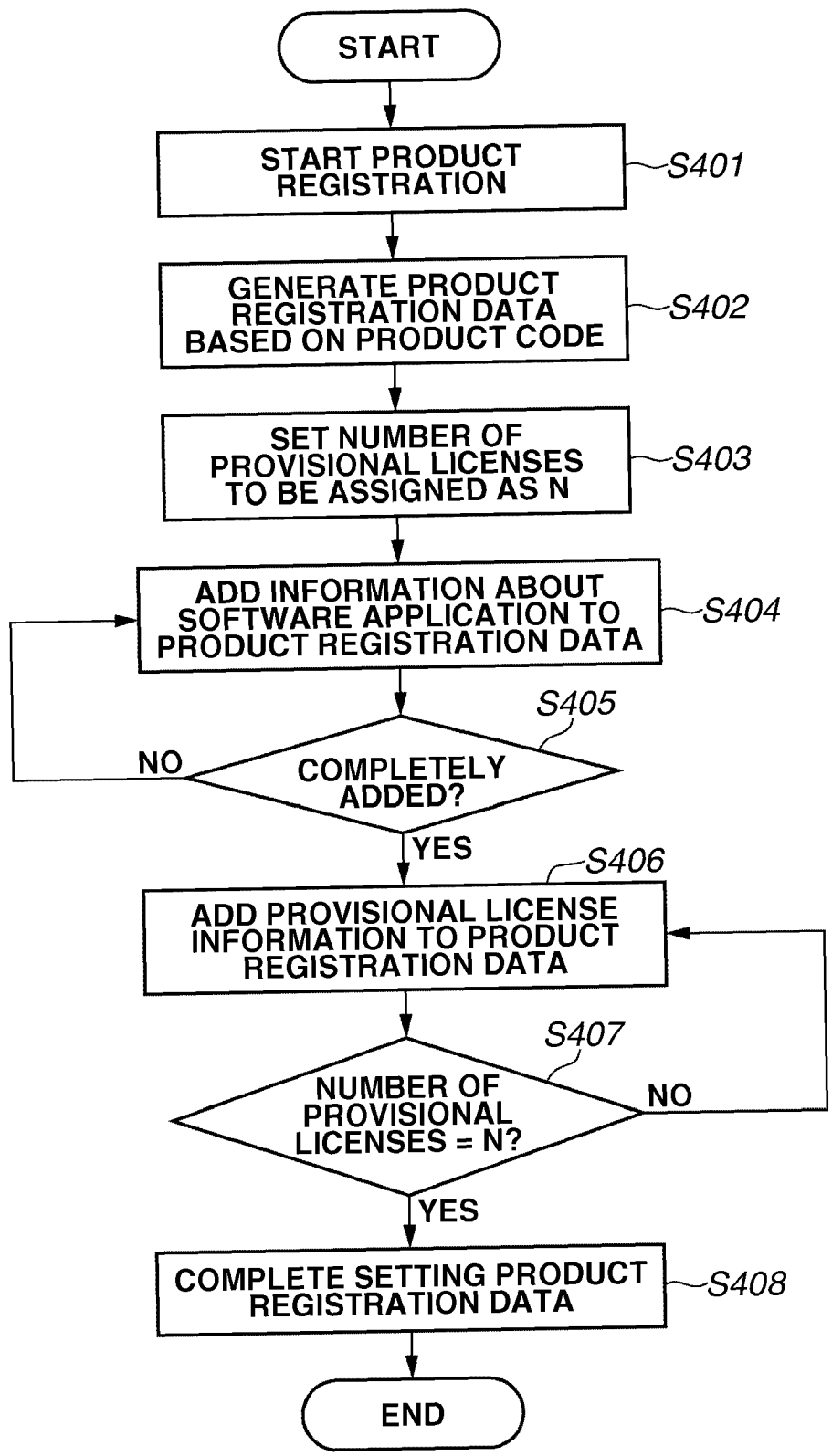
FIG. 4 is a flowchart of processing for registering new product registration data in a license issuing server based on a program executed by a central processing unit (CPU) according to an exemplary embodiment of the present invention.

FIG. 4 is a flowchart of processing for registering new product registration data 115 in the license issuing server 102 based on a program executed by the CPU.

To be more specific, this processing is to register the product registration data 115 about a new software application package 104 in the database 103 so as to provide the new software application package 104 based on operations of the license issuing server 102. In step S401, the license issuing server 102 starts up the product registration unit 117 in response to a user's instruction.

In step S402, the product registration unit 117 creates a table for a new software application package in response to a user's input of the product code 105. In step S403, the product registration unit 117 sets the number of provisional licenses to be assigned to software applications to be released in response to a user's instruction.

In step S404, the product registration unit 117 sets information about a software application scheduled to be released such as a software application name and the content ID 303 corresponding to the software application. As shown in steps S404 and S405, information may be set as many times as the number of software applications scheduled to be released. Alternatively, information about a plurality of software applications may be set at a time. A method for setting the information may be set based on a user's operation, or a method for registering a software application package distributed from a provider of a software application may be automatically set.

Input of the name of the software applications scheduled to be released is completed in step S405. Subsequently, in steps S406 and S407, the product registration unit 117 associates the content ID 303 with each of provisional licenses and repeats the process for the number of provisional licenses set in step S403. Since the software application name 302 of each provisional license has not been determined, no data is registered at this time. In step S408, after the completion of registering the provisional license, the product registration unit 117 saves the settings of the product registration data 115 and terminates the processing.

The settings of the above described processing are shown in FIG. 3, namely a code "1234" is set as the product code 105, the number of provisional licenses to be assigned 301 is set to three, and "software application A (content ID: 111)" and "software application B (content ID: 222)" are set as software applications scheduled to be released. Then, three content IDs of 333, 444, and 555 are set for provisional licenses for software applications planned to be released in the future.

Referring to FIG. 1 and FIGS. 5A to 5G, an operation of issuing new software application licenses including a plurality of provisional licenses from the license issuing server 102 to the client device A is described based on changes of data managed by the client device 101 and the license issuing server 102.

The client device A purchases the software application package 104 including the software application A and the software application B which have the product code 105 of "1234". The software application A is installed to the client device A. The content ID 303 of the software application A is "111", and the content ID 303 of the software application B is "222".

If the client device A newly installs the software application package 104 with the product code 105 of "1234", the client device A requests a license file from the license issuing server 102. The license issuing server 102 requests the client device A to transmit the LA #107 for licensing the client device A. Any unique number can be used as the LA #107, and characters and symbols may be used in a code.

A user enters "AAA" as the LA #107 on a license access number input screen, and "AAA" is transmitted together with the license use information 111 of FIG. 5A to the license issuing server 102. In the present exemplary embodiment, the license use information 111 including the LA #107 is transmitted, but the data can be transmitted in any form without particular limitations as long as information, such as a target software application name or its content ID, a state of a license file, and the LA #, can be sent to the license issuing server.

The license issuing server 102 obtains the LA #107 of "AAA" and the license use information 111 as illustrated in FIG. 5A. Then, the license access number management data 116 is generated in the database 103. The generated data is illustrated in FIG. 5E.

Next, a registered software application name in the license access number management data 116 of FIG. 5E is compared with that in the product registration data 115 of FIG. 5G to confirm that all software application names are registered in the product registration data 115.

Then, the license issuing server 102 updates the license access number management data 116 based on all content IDs 303 including IDs for provisional licenses registered in the product registration data 115. Further, the license file generating unit 113 of the license issuing server 102 generates a license file (LF) 114 corresponding to the content ID 303 based on the product code 105 and the LA #107 of "AAA". Then, the license access number management data 116 is updated based on information about the generated license file. The updated data is illustrated in FIG. 5F.

Then, the license issuing server 102 sends the five license files (LFs) 114 including the generated three provisional licenses to a requester, the client device A, together with the content Ids 303 to collectively issue a plurality of licenses. The client device A receives the five license files (LFs) 114 including the three provisional licenses and the content IDs. Then, the license use information 111 is updated as illustrated in FIG. 5B, and the client device A starts the software application A using "vvv" as the license file (LF) 114 of the software application A.

It is assumed that the software application B is then installed to the client device A. In this case, it is determined whether a content ID matching the content ID "222" of the software application B is registered in the license use information 111. In this example, "222" is registered as the content ID 303 of the software application B in the license use information 111. As a result, the license use information 111 is updated as illustrated in FIG. 5C. The client device A can start the software application B using the license file (LF) 114, "www", without requesting a license from the license issuing server 102.

It is assumed that the client device A then purchases the software application package 104 in which a software application D having the product code 105 of "1234" is registered, and the software application D is installed to the client device A.

As described above, it is determined whether a content ID matching the content ID 303 of the software application D, "444", is registered in the license use information 111. In this example, "444" is registered as the content ID 303 in the license use information 111. Thus, the license use information 111 is updated as illustrated in FIG. 5D. The client device A can start the software application D using the license file (LF) 114, "yyy" without requesting a license from the license issuing server 102.

As described above, the client device A can install any software application corresponding to a plurality of packaged licenses that have been already acquired without requesting a license from the license issuing server 102.

Next, referring to FIG. 1 and FIGS. 6A to 6F, an operation of sending a request to issue a new license from a client device B which is different from the client device A is described based on changes of data managed by the client device 101 and the license issuing server 102.

The client device B purchases the software application package 104 including the software application C having the product code 105 of "1234", and the software application C is installed to the client device B. The content ID 303 of the software application C is "333". Since the software application package 104 having the product code 105 of "1234" is newly installed to the client device B, the client device requests a license from the license issuing server 102.

The license issuing server 102 requests the client device B to transmit the LA #107 for acquiring a license file. The client device B obtains the LA #107, "BBB", in response to user's input on the license access number input screen, and transmits the LA #107, "BBB", together with the license use information 111 of FIG. 6A to the license issuing server 102. The LA # is unique to each client device. Therefore, the LA # input by the client device B is different from that input by the client device A.

The license issuing server 102 obtains the LA #107, "BBB", and the license use information 111 of FIG. 6A. Then, the license access number management data 116 as illustrated in FIG. 6C is generated in the database 103.

The license issuing server 102 compares a registered software application name in the license access number management data 116 of FIG. 6C with a registered software application name in the product registration data 115 of FIG. 6E. Then, the server finds a software application name, "software application C", which is unregistered in the product registration data 115 of FIG. 6E.

The license issuing server 102 determines whether the content ID "333" of the software application C registered in the license access number management data 116 of FIG. 6C is registered in the product registration data 115. In this example, since the content ID "333" is registered, the license issuing server 102 confirms that the software application C is assigned to the provisional license corresponding to the content ID 303 of "333" in the product registration data 115.

Then, the software application C is input in the field of the software application name corresponding to the content ID 303 of "333" in the product registration data 115 to update the product registration data 115. Moreover, the license issuing server 102 additionally prepares the content ID 303 of "666" by the license file generating unit 113 to maintain the specified number of provisional licenses to be assigned 301 at three, and updates the product registration data 115 as illustrated in FIG. 6F.

Next, the license issuing server 102 updates the license access number management data 116 as illustrated in FIG. 6C based on all content IDs 303 including IDs for provisional licenses registered in the product registration data 115 of FIG. 6F. Further, the license file generating unit 113 generates six license files (LFs) 114 using the content ID 303 based on the product code 105 and the LA #107, "BBB". Then, the license access number management data 116 is updated based on information about the generated license file.

The updated license access number management data is shown in FIG. 6D. Then, the license issuing server 102 transmits the generated six license files (LFs) 114 including the provisional licenses together with the content IDs to a requester, the client device B, to collectively issue a plurality of licenses.

The client device B receives the six license files (LFs) 114 including the provisional licenses and the content IDs. The license use information 111 is updated as illustrated in FIG. 6B. Then, the client device B starts the software application C using the license file (LF) 114 of the software application C, "jjj".

As described above, the license issuing server 102 obtains the license use information 111 transmitted from the client device 101 when the client device 101 requests a license to confirm that a provisional license is used. Upon confirming that the provisional license is used, the license issuing server 102 generates additional provisional licenses to compensate for the used ones, and collectively issues a plurality of licenses including the additional provisional license to the client device 101.

Figure 8:
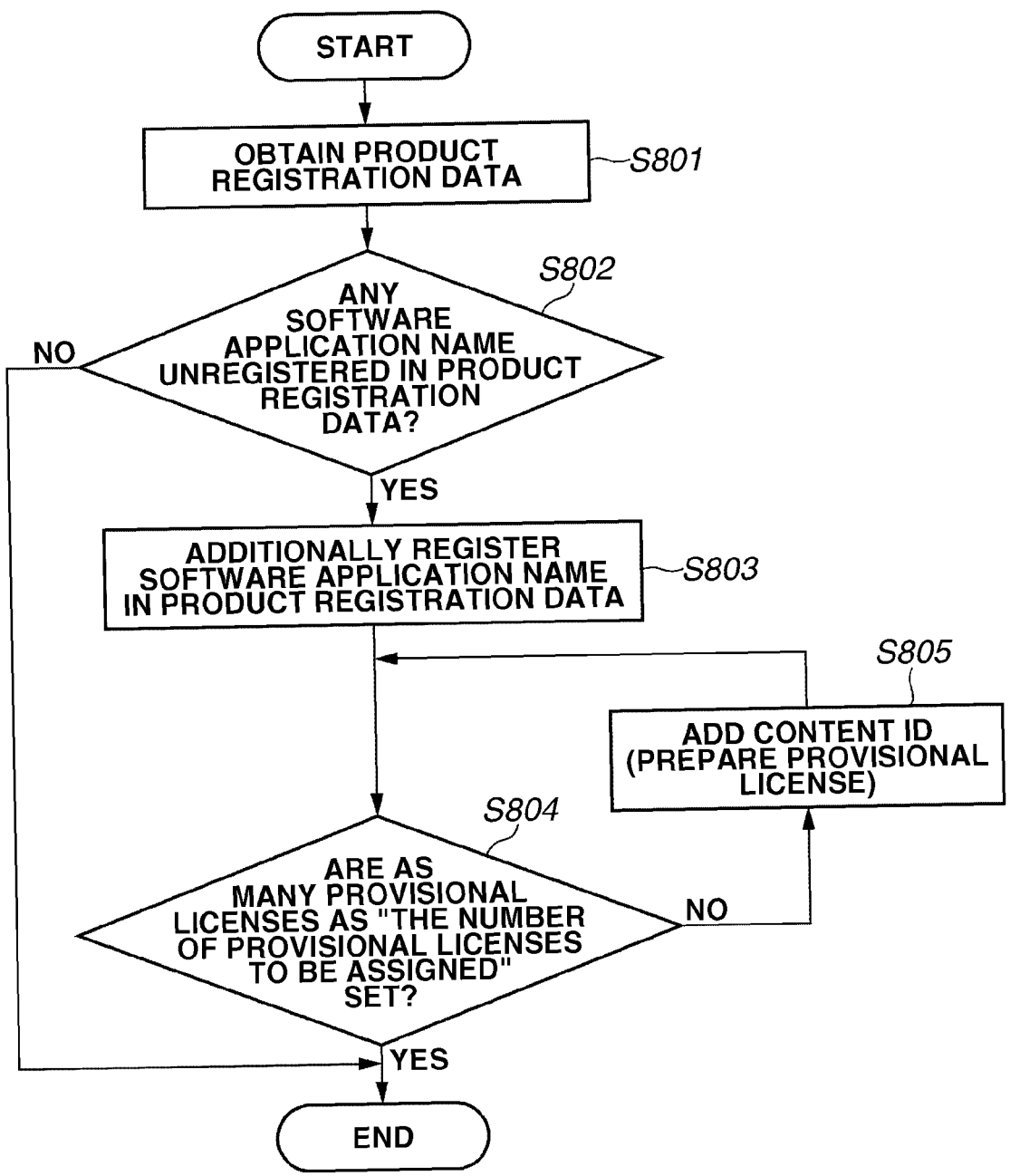
FIG. 8 is a flowchart of processing for updating product registration data based on a program executed by a CPU according to an exemplary embodiment of the present invention.

Next, referring to flowcharts of FIGS. 7, 8, and 9, processing for issuing a plurality of software application licenses including provisional licenses from the license issuing server 102 to the client device 101 in the license management system is described. The above described changes of data in FIGS. 5A to 5G and FIGS. 6A to 6F are realized by the processing of the flowcharts.

FIG. 7 is a flowchart of processing for generating and issuing a plurality of software application licenses including a provisional license in the license issuing server 102 based on a program executed by the CPU.

In step S701, the receiving unit 121 obtains the LA #107 that is transmitted from the client device 101 via the network 108 to request a license. In step S702, the license file generating unit 113 determines whether the obtained LA #107 requests a license for a single software application or a license for a software application package.

If it is determined that a license for a single software application is requested in step S702 (NO in step S702), the license file generating unit 113 generates a license file for a single software application in step S703. In step S704, the license issuing unit 122 transmits the generated license file for a single software application to the client device 101 to issue a license and terminates the processing.

If the license file generating unit 113 determines that a license for a software application package is requested in step S702 (YES in step S702), the license issuing server 102 requests the license use information 111 from the client device 101. Then, in step S705, the receiving unit 121 obtains the license use information 111 of the client device 101. Next, in step S706, the license file generating unit 113 determines whether the license access number management data 116 corresponding to the LA #107 obtained in step S701 is registered in the database 103.

If the license access number management data 116 corresponding to the LA #107 obtained in step S701 is registered (YES in step S706), the processing advances to step S707. On the other hand, if the license access number management data 116 corresponding to the LA #107 is not registered (NO in step S706), the processing advances to step S708.

In step S707, the license file generating unit 113 additionally registers a software application name included in the license use information 111 obtained in step S705 to the license access number management data 116 registered in the database 103. Processing then proceeds to step S709. In step S708, the license file generating unit 113 generates new license access number management data 116 corresponding to the LA #107 obtained in step S701. Then, the software application name included in the license use information 111 obtained in step S705 is registered in the generated license access number management data 116. Processing then proceeds to step S709.

In step S709, the license file generating unit 113 updates the product registration data 115 registered in the database 103. This processing is described below with reference to FIG. 8.

In step S710, the license file generating unit 113 sets data of the content ID 303 in the product registration data 115 after the processing in step S709, to the license access number management data 116. In step S711, the license file generating unit 113 generates software application license files (LFs) corresponding to the LA #107 obtained in step S701 based on the content ID 303 in the license access number management data 116 set in step S710. The generated software application licenses (LFs) include as many provisional license files as a preset number of provisional licenses to be assigned.

Next, in step S712, the license file generating unit 113 registers information about the software application license files generated in step S711 to the license access number management data 116 corresponding to the LA #107 obtained in step S701.

Then, in step S713, the license issuing unit 122 collectively transmits license files corresponding to the LA #107 obtained in step S701 to the client device 101 to issue licenses.

FIG. 8 is a flowchart of processing for updating the product registration data 115 in step S709 of FIG. 7 based on a program executed by the CPU.

In step S801, the product registration unit 117 determines a product code based on the license access number LA #107, and obtains the product registration data 115 corresponding to the product code. In step S802, the product registration unit 117 compares a registered software application name in the product registration data 115 obtained in step S801 with a registered software application name in the license access number management data 116 generated in step S707 or S708 of FIG. 7.

If a software application name unregistered in the product registration data 115 is found as a result of comparison in step S802 (YES in step S802), in step S803, the product registration unit 117 additionally registers the unregistered software application name in the product registration data 115 to update the product registration data 115. If no unregistered software application name is present in step S802 (NO in step S802), the processing of the flowchart of FIG. 8 is terminated.

In step S804, the product registration unit 117 compares the number of content IDs 303 corresponding to the blank field of software application name in product registration data 115 with the number of provisional licenses to be assigned, "n", registered in the product registration data 115. This process is carried out to determine whether provisional licenses are set in the product registration data 115 in a number corresponding to the preset number of provisional licenses to be assigned.

If the number of content IDs 303 corresponding to the blank field of software application name is smaller than the number of provisional licenses to be assigned 301, "n", as a result of comparison in step S804 (NO in step S804), the processing advances to step S805. In step S805, the product registration unit 117 adds the content IDs 303 as many as the number of provisional licenses to be assigned 301 to the product registration data 115.

On the other hand, if the number of content IDs 303 corresponding to the blank field of software application name in the product registration data 115 is equal to the number of provisional license to be assigned, "n" (YES in step S804), the updating processing of the product registration data 115 is terminated.

FIG. 9 is a flowchart of processing for acquiring and using a software application license in the client device 101 based on a program executed by the CPU.

In step S901, the software application management unit 109 installs a software application in response to a user's operation. As a result, the software application is installed to the client device 101. The software application may be collectively installed as a software application package including a plurality of software applications. In step S902, the software application management unit 109 starts the installed software application in response to a user's operation.

In step S903, the license control unit 110 confirms whether a license file is registered in the client device 101 upon starting the software application. If it is determined that a license file is registered (YES in step S903), processing advances to step S910. On the other hand, if it is determined that no license file is registered (NO in step S903), the license control unit 110 displays an acquirement screen on the display unit to acquire a license in step S904. In step S905, the receiving unit 131 obtains the LA #107 that is input by a user's operation.

In step S906, the transmitting unit 132 transmits the obtained LA #107 to the license issuing server 102. Further, in step S907, the license control unit 110 transmits the license use information 111 of the client device 101 to the license issuing server 102 via the transmitting unit 132.

In step S908, the receiving unit 131 receives a license file from the license issuing server 102 as a response to the LA #107 and the license use information 111. In this case, a plurality of license files may be transmitted at a time, or data corresponding to a provisional license may be included.

In step S909, the license control unit 110 updates the license use information 111 of the client device 101 based on information about the license file obtained in step S908 to register a plurality of the obtained license files in the client device 101.

In step S910, the license control unit 110 searches for a license file corresponding to a target software application to be started. Then, in step S911, the license control unit 110 determines whether the license file corresponding to the target software application is registered. The determination is made based on whether the content ID 303 assigned to the software application matches with the content ID 303 associated with the license file.

If no license file corresponding to the target software application is found (NO in step S911), the processing advances to step S904. In step S904, the same processing (described above) might be repeated several times and thus, a user may forcedly terminate the processing of the flowchart.

If the license file corresponding to the target software application is found (YES in step S911), in step S912, the license control unit 110 determines whether a software application name of the target software application is registered in the license use information 111.

In step S912, if a software application name of the target software application is registered in the license use information 111 (YES in step S912), processing proceeds to step S914. On the other hand, in step S912, if no software application name of the target software application is registered in the license use information 111, the license file is identified as a provisional license. In this case (NO in step S912), in step S913, the license control unit 110 additionally registers a software application name of the target software application in the license use information 111.

In step S914, the license control unit 110 checks an activation condition of the target software application based on the license file. The activation condition includes, for example, a validity of a license and a condition of a client device to be licensed. If the activation condition is satisfied (YES in step S914), in step S915, the software application management unit 109 starts the software application using the obtained license file. Then the processing shown in FIG. 9 ends. If the activation condition is not satisfied (NO in step S914), the processing returns to step S904.

The present exemplary embodiment describes the processing when the client device requests the license issuing server to issue a license for a software application package including a plurality of software applications. In particular, according to this processing, the server can collectively issue licenses for the software application package including provisional licenses to the client device by transmitting license files for the purchased software application package.

The client device can start a desired software application in the software application package using the collectively issued licenses and the provisional licenses. As for an additionally released software application in the software application package, since the provisional license is assigned to the application, the additionally released software application can be started only in the client device without requesting a license from the license issuing server.

The license issuing server further performs the following processing. When receiving a request to issue a license, the license issuing server obtains the license use information from the client device. If it is found that a provisional license is used, the license issuing server issues a new provisional license.

Referring to FIG. 1, FIGS. 10A to 10F, and FIGS. 11A to 11E, operations of the license management system according to a second exemplary embodiment are described based on changes of data managed by the client device 101 and the license issuing server 102. The present exemplary embodiment will be described on the assumption that the data updating processing of FIG. 5D is executed in the client device A and the data updating processing of FIG. 5F is executed in the license issuing server 102 via the processing of the first exemplary embodiment.

First, an operation of additionally issuing a plurality of software application licenses including a provisional license to the client device A from the license issuing server 102 as illustrated in FIGS. 10A to 10F is described based on changes of the data managed by the client device 101 and the license issuing server 102.

The client device A purchases a software application package including a software application F whose product code 105 is "1234", and the software application F is additionally installed to the client device A. In this example, the content ID 303 of the software application F is "666" as illustrated in FIG. 10A.

Since a license file for the software application F having the content ID 303 of "666" is not registered, the client device A requests a license from the license issuing server 102. At this time, the client device A transmits the license access number LA #107 to acquire a license. The client device A obtains the LA #107, "AAA", which is input by a user on the license access number input screen, and transmits the obtained LA #107 together with the license use information 111 of FIG. 10A to the license issuing server 102.

The license issuing server 102 obtains information about the LA #107, "AAA", and the license use information 111 of FIG. 10A. Then, the license issuing server 102 updates the license access number management data 116 in the database 103 as illustrated in FIG. 10C.

The license issuing server 102 compares a software application name registered in the license access number management data 116 of FIG. 10C with a software application name registered in the product registration data 115 of FIG. 10E. Then, the license issuing server 102 confirms a software application name "software application D" and "software application F" unregistered in the product registration data 115 of FIG. 10E.

The license issuing server 102 first confirms that the software application D is assigned to a provisional license corresponding to the content ID 303 of "444" and the software application F is assigned to a provisional license corresponding to the content ID 303 of "666". Then, the license issuing server 102 additionally registers the "software application D" and "software application F" in the field of software application name corresponding to the content IDs "444" and "666" in the product registration data 115.

Next, the license issuing server 102 additionally prepares content IDs "777" and "888" to the specified number 301 of provisional licenses to be assigned, at three, and updates the product registration data 115 as illustrated in FIG. 10F.

Then, the license issuing server 102 updates the license access number management data 116 based on the product registration data 115 of FIG. 10F. In this example, in the license issuing server 102, the license file generating unit 113 generates eight license files (LFs) 114 corresponding to all content IDs to update the license access number management data 116 based on information thereof. The updated license access number management data 116 is illustrated in FIG. 10D. Then, the license issuing server 102 transmits the generated eight license files (LFs) 114 together with the content IDs to the client device A to collectively issue licenses.

At this time, the license issuing server 102 generates all license files. Alternatively, the license issuing server 102 may generate only license files corresponding to the added content IDs (content IDs "666" to "888") to issue licenses to the client device A.

The client device A receives the eight license files 114 and the content IDs, and updates the license use information 111 as illustrated in FIG. 10B. Then, the client device A starts the software application F using the license file "aaa" for the software application F.

As described above, after confirming that the client device A used the provisional license, the license issuing server 102 generates an additional license file corresponding to the provisional license, and issues a license to the client device 101. This processing can be realized in the license issuing server 102 upon receiving the license use information 111 together with a request to issue an additional license from the client device 101.

Next, it is assumed that validity is set in the plurality of software application licenses including the registered provisional license as a license use condition. Referring to FIGS. 11A to 11E, an operation of updating and issuing a license in place of an expired license is described based on changes of the data managed by the client device 101 and the license issuing server 102.

For example, it is assumed that a license for the software application C installed to the client device B is expired. The license control unit 110 of the client device B detects that the license for the software application C is expired or is about to expire. At this time, the license control unit 110 informs a user about the expiration of the license on a display screen or the like and displays a license acquisition screen.

The client device B obtains the license access number LA #107, "BBB", which is input by a user on the license access number input screen, and transmits the obtained license access number LA #107 to the license issuing server 102 together with the license use information 111 of FIG. 11A.

The license issuing server 102 obtains information about the LA # of "BBB" and the license use information 111 of FIG. 11A. Then, the license issuing server 102 updates the license access number management data 116 in the database 103 as illustrated in FIG. 11C.

Next, the license issuing server 102 compares a software application name registered in the license access number management data 116 of FIG. 11C with a software application name registered in the product registration data 115 of FIG. 11E. In this example, the license issuing server 102 confirms that there is no software application name which is registered in the license access number management data 116 but not registered in the product registration data 115 of FIG. 11E.

Next, the license issuing server 102 updates the license access number management data 116 based on the product registration data 115 of FIG. 11E. Further, the license issuing server 102 generates the license file (LF) 114 that is given a new validity in the license file generating unit 113. At this time, the license access number management data 116 is updated as illustrated in FIG. 11D.

The license issuing server 102 transmits eight license files 114 given a new validity and including a provisional license to the client device B together with content IDs to collectively issue licenses.

The client device B receives the eight license files 114 given a new validity and including the provisional license and the content IDs. Then, the client device B updates the license use information 111 as illustrated in FIG. 11B. The client device B starts the software application C using a license file "jjj" having a new validity.

As described above, the client device 101 may send a request to update and issue a license in place of a license that does not match with the license use condition. In such cases, the license issuing server 102 checks the use of the past provisional license based on the received license use information 111. Then, the license issuing server 102 can issue an additional license as needed.

According to the present exemplary embodiment, the license issuing server 102 obtains license use information 111 transmitted from the client device at the time of requesting issuance of an additional license or reissuance of a license to check the use of the issued provisional license. If it is confirmed that the provisional license is used, the license issuing server 102 may additionally generate provisional licenses to compensate for the used licenses and collectively issue the licenses to the client device again. Therefore, discontinuance of the provisional licenses can be prevented.

According to the present exemplary embodiment, the license issuing server 102 can manage a plurality of client devices. By comparing the product registration data 115 managed by the license issuing server 102 with the license use information 111 managed by the client device, the license issuing server 102 can check the use of the provisional license.

Further, as described above, according to the present embodiment, the license issuing server can collectively issue a plurality of licenses including a provisional license for a software application planed to be additionally installed, based on specific information given to a software application.

Furthermore, the license issuing server can additionally generate a provisional license and control the number of licenses to be issued to the client device by acquiring data about a status of use of licenses in the client device on a license request basis. Accordingly, the client device does not need to request a license from the license issuing server each time an additional software application is installed, therefore user-friendliness is enhanced.

Moreover, the license issuing server has functions to automatically obtain and manage the status of the use of licenses and automatically issue a plurality of licenses. Accordingly, updating and managing processing in the license issuing server regarding issuance of the license can be considerably facilitated and a server management property can be remarkably improved.

The present invention is applicable to either a system including a plurality of devices or an apparatus including only one device.

It should be noted that the present invention can be achieved by directly or remotely supplying a software program for realizing the functions of the exemplary embodiments described above to a system or an apparatus, and then having a computer of the system or the apparatus read out and execute the supplied program code. As long as the functions of the program are ensured, the program code can be supplied in any form. Consequently, the program code installed on the computer embodies the present invention.

In this case, as long as the functions of the program are ensured, the program code can be supplied in any form such as an object code, a program that is executed by an interpreter, or script data that is supplied to an operating system (OS).

Storage media for supplying the program include a hard disk, an optical disk, and a magneto-optical disk. In addition, a CD-ROM, a compact disk recordable (CD-R), a compact disk rewritable (CD-RW), a magnetic tape, a nonvolatile memory card, a ROM, and a digital versatile disk (DVD) (DVD-ROM and DVD-R) can be used.

As another method for supplying a program, a program can be supplied by connecting to the Internet website from a client PC browser and downloading the computer program itself or a compressed file having an automatic installation function, onto a storage medium such as a hard disk. The program code for the program can be divided into a plurality of files and each of the files can be downloaded from different websites.

It is also possible to supply the program by encrypting the program, storing the program in a storage medium such as a CD-ROM, and distributing the program to users. The users who satisfy predetermined conditions is allowed to download key information that decodes the encrypted program from a website via the Internet and can execute the encrypted program and install the program on a computer by using the key information.

An OS running on the computer can perform all or a part of the actual processing based on a command from the program and can implement the functions of the exemplary embodiments.

Further, the program read from a storage medium can be written in a memory in a function expansion board inserted in a computer or a function expansion unit connected to the computer and then, a CPU etc. provided in the function expansion board or the function expansion unit carries out all or a part of the actual processing based on a command from the program to implement the functions of the exemplary embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-201792 filed Aug. 2, 2007, which is hereby incorporated by reference herein in its entirety.

What is claimed is:

1. An information processing apparatus, comprising:
a processor;
a management unit executed by the processor and configured to manage information about a plurality of software applications as a package in association with identification information, wherein the plurality of software applications includes a software application installable to a client device and a software application not yet installable to the client device;
a receiving unit configured to receive, from the client device, a request for a license file which can identify the identification information;
an identification information determination unit configured to determine whether the identification information identified based on the received request requests a license for a software application package or a license for a single software application;
a generating unit configured to generate a plurality of license files corresponding to the information about the plurality of software applications managed by the management unit in association with the identification information identified based on the request received by the receiving unit, if the identification information determination unit determines that the identification information identified based on the received request requests the license for the software application package; and
a transmitting unit configured to transmit the plurality of license files generated by the generating unit to the client device serving as a source of the request received by the receiving unit,
wherein the software applications not yet installable to the client device include an unreleased software application, and
wherein, if the identification information determination unit determines that the identification information identified based on the received request requests the license for the single software application, the generating unit generates a license file corresponding to the information about the single software application, and the transmitting unit transmits the generated license to the client device.

2. The information processing apparatus according to claim 1, wherein the request received by the receiving unit from the client device includes license access information to identify the identification information and information about a software application installed to the client device, and
the information processing apparatus further comprises a storage unit configured to store management data to manage software applications installed to each client device and a license file generated for the corresponding client device.

3. The information processing apparatus according to claim 1, wherein the management unit comprises:
a setting unit configured to set the number of software applications not yet installable to the client device, which are managed in association with the identification information; and
a determination unit configured to determine that the software applications not yet installable to the client device become installable to the client device, and
wherein the management unit manages information about a plurality of software applications so that the generating unit can generate license files corresponding to the software application determined to become installable by the determination unit and the software applications not yet installable to the client device, the number of which is set by the setting unit.

4. A method comprising:
managing information about a plurality of software applications as a package in association with identification information, wherein the plurality of software applications includes a software application installable to a client device and a software application not yet installable to the client device;
receiving a request for a license file to identify the identification information from the client device;
determining whether the identification information identified based on the received request requests a license for a software application package or a license for a single software application;
generating a plurality of license files corresponding to the information about the plurality of software applications managed in association with the identification information identified based on the received request, if determining determines that the identification information identified based on the received request requests the license for the software application package; and
transmitting the plurality of generated license files to the client device serving as a source of the received request, and
wherein the software applications not yet installable to the client device include an unreleased software application, and
wherein, if determining determines that the identification information identified based on the received request requests the license for the single software application, a license file is generated corresponding to the information about the single software application, and the generated license is transmitted to the client device.

5. The method according to claim 4, wherein if a request received from the client device is to request a license file to activate one software application, a license file corresponding to the information about the one software application is generated, and the generated license file is transmitted to the client device.

6. The method according to claim 4, wherein a request received from the client device includes license access information to identify the identification information and information about a software application installed to the client device, and the method further comprises storing management data to manage software applications installed to each client device and a license file generated for the corresponding client device.

7. The method according to claim 4, further comprising:
setting the number of software applications not yet installable to the client device, which are managed in association with the identification information;
determining that the software applications not yet installable to the client device become installable to the client device; and
managing information about a plurality of software applications so as to be able to generate license files corresponding to the software application determined to become installable and the software applications not yet installable to the client device, the number of which is set.

8. A non-transitory computer-readable storage medium storing a program that causes a computer to execute the method according to claim 4.

9. A client device, comprising:
a processor;
a requesting unit executed by the processor and configured to request a license issuing server to issue a license file to activate an installed first software application if the license file to activate the first software application is not managed;
an acquisition unit configured to collectively acquire a plurality of license files corresponding to information about the first software application and another software application as a response to a request from the requesting unit, wherein said another software application is different from the first software application, and is managed in association with the same identification information as the first software application in the license issuing server; and
an activation unit configured to activate the first software application based on the license file to activate the first software application, which is acquired by the acquisition unit,
wherein the information about the software application managed in association with the identification information includes information about a software application not yet installable to the client device, and the plurality of license files acquired by the acquisition unit include a license file to activate the software application not yet installable to the client device, and
wherein the software applications not yet installable to the client device include an unreleased software application.

10. The client device according to claim 9, wherein if the license files acquired by the acquisition unit include a license file to activate a new software application upon installing the software application, the activation unit activates the software application based on the license file for activating the software application without requesting a license file from the license issuing server.

11. The client device according to claim 9, further comprising:
a determination unit configured to determine whether it is necessary to reacquire a license file corresponding to a software application to be activated based on an activation condition for the software application described in the license file,
wherein if the determination unit determines that it is necessary to reacquire the license file corresponding to the software application, the requesting unit sends a request to reacquire the license file.

12. A method comprising:
requesting a license issuing server to issue a license file to activate an installed first software application in a client device if the license file to activate the first software application is not managed;
collectively acquiring a plurality of license files corresponding to information about the first software application and another software application as a response to a request, wherein said another software application is different from the first software application and is managed in association with the same identification information as the first software application as a response to the request; and
activating the first software application based on the acquired license file to activate the first software application,
wherein the information about the software application managed in association with the identification information includes information about a software application not yet installable to the client device, and the acquired plurality of license files include a license file to activate the software application not yet installable to the client device, and
wherein the software applications not yet installable to the client device include an unreleased software application.

13. The method according to claim 12, wherein if the acquired license files include a license file to activate a new software application upon installing the software application, the software application is activated based on the license file to activate the software application without requesting a license file from the license issuing server.

14. The method according to claim 12, further comprising:
determining whether it is necessary to reacquire a license file corresponding to a software application to be activated based on an activation condition for the software application described in the license file; and
sending a request to reacquire the license file if it is determined that it is necessary to reacquire the license file corresponding to the software application.

15. A non-transitory computer-readable storage medium storing a program that causes a computer to execute the method according to claim 12.

16. A license management system including a client device and a license issuing server connected via a network, the license management system comprising:
the client device which comprises
a requesting unit configured to request the license issuing server to issue a license file to activate an installed software application,
an acquisition unit configured to acquire a plurality of license files corresponding to at least information about the software application which is sent as a response to the request from the requesting unit, and
an activation unit configured to activate the software application based on the license file acquired by the acquisition unit; and
the license issuing server which comprises
a management unit configured to manage information about a plurality of software applications in association with identification information, wherein the plurality of software applications includes a software application installable to the client device and a software application not yet installable to the client device, a receiving unit configured to receive a request for a license file which can identify the identification information from the client device, an identification information determination unit configured to determine whether the identification information identified based on the received request requests a license for a software application package or a license for a single software application, a generating unit configured to generate a plurality of license files corresponding to the information about the plurality of software applications managed by the management unit in association with the identification information identified based on the request received by the receiving unit, if the identification information determination unit determines that the identification information identified based on the received request requests the license for the software application package, and a transmitting unit configured to transmit the plurality of license files generated by the generating unit to the client device serving as a source of the request received by the receiving unit, and wherein the software applications not yet installable to the client device include an unreleased software application, and wherein, if the identification information determination unit determines that the identification information identified based on the received request requests the license for the single software application, the generating unit generates a license file corresponding to the information about the single software application, and the transmitting unit transmits the generated license to the client device.

17. A method for controlling a license management system including a client device and a license issuing server connected via a network, the method comprising:

requesting the license issuing server to issue a license file to activate an installed software application;

acquiring a plurality of license files corresponding to at least information about the first software application and another software application as a response to a request, wherein said another software application is different from the first software application;

activating the software application based on the acquired license file;

managing information about a plurality of software applications including a software application installable to the client device and a software application not yet installable to the client device in association with identification information;

determining whether the identification information identified based on the received request requests a license for a software application package or a license for a single software application;

generating a plurality of license files corresponding to the information about the plurality of software applications managed in association with the identification information identified based on the request received from the client device, if the identification information identified based on the received request requests the license for the software application package; and transmitting the generated plurality of license files to the client device serving as a source of the request, and wherein the software applications not yet installable to the client device include an unreleased software application, and wherein, if the identification information identified based on the received request requests the license for the single software application, the method further comprising generating a license file corresponding to the information about the single software application, and transmitting the generated license to the client device.

* * * * *